US012782053B2

(12) United States Patent
Lefebvre et al.

(10) Patent No.: US 12,782,053 B2
(45) Date of Patent: Nov. 3, 2026

(54) PROCESS FOR ENERGY-EFFICIENT DRYING OF GERMINATED SEEDS AND DEVICE FOR IMPLEMENTATION OF THE PROCESS

(71) Applicant: Bühler GMBH, Beilngries (DE)

(72) Inventors: Clêment Lefebvre, Renens (CH); Michael Rittenauer, Lausanne (CH); Albert Garcia Torrentó, Winterthur (CH)

(73) Assignee: BÜHLER GMBH, Beilngries (DE)

( * ) Notice: Subject to any disclaimer, the term of this patent is extended or adjusted under 35 U.S.C. 154(b) by 325 days.

(21) Appl. No.: 18/682,451

(22) PCT Filed: Aug. 11, 2022

(86) PCT No.: PCT/EP2022/072587
§ 371 (c)(1),
(2) Date: Feb. 9, 2024

(87) PCT Pub. No.: WO2023/017130
PCT Pub. Date: Feb. 16, 2023

(65) Prior Publication Data

US 2024/0353177 A1 Oct. 24, 2024

(30) Foreign Application Priority Data

Aug. 11, 2021 (EP) .................................... 21190835

(51) Int. Cl.
*F26B 25/22* (2006.01)
*C12C 1/073* (2006.01)
(Continued)

(52) U.S. Cl.
CPC .............. *F26B 25/22* (2013.01); *C12C 1/073* (2013.01); *C12C 1/10* (2013.01); *F26B 9/063* (2013.01);
(Continued)

(58) Field of Classification Search
CPC .......... F26B 25/22; F26B 9/063; F26B 21/33; F26B 21/37; F26B 21/35; F26B 2200/06; C12C 1/073
See application file for complete search history.

(56) References Cited

U.S. PATENT DOCUMENTS 9,885,520 B1 * 2/2018 Abbasi .................. F26B 21/001
2015/0354895 A1 12/2015 Bloemendaal et al.
2020/0263923 A1 8/2020 Bloemendaal

FOREIGN PATENT DOCUMENTS

DE 3407685 C1 8/1985
EP 0097965 A2 1/1984
(Continued)

OTHER PUBLICATIONS

International Preliminary Report on Patentability submitted Nov. 11, 2022 and completed Feb. 16, 2023, received for International Application No. PCT/EP2022/072587, filed Aug. 11, 2022, 6 pages. (Submitting English translation only).
(Continued)

*Primary Examiner* — Ngoc T Nguyen
(74) *Attorney, Agent, or Firm* — XSENSUS LLP

(57) ABSTRACT

A process and device for energy-efficient drying of green malt in a drying kiln using a rotational speed-modulated fan for directing an air mass flow through a bed of drying material for the green malt. The drying is implemented for a specified maximum kiln time. To do this, grain moisture content and a grain mass of a grain are detected, which constitutes a basis for the bed of drying material of the green malt after steeping and germinating, Furthermore, an ambient air humidity of an ambient air used for the air mass flow and a plurality of weather forecast data are detected at least with respect to the ambient air humidity and, during drying, a moisture content of the drying material of the green malt is monitored up to a specified limit. A rotational speed
(Continued)

modulation of the fan is controlled such that the specified maximum kiln time is reached.

19 Claims, 7 Drawing Sheets

(51) Int. Cl.

| | |
|---|---|
| ***C12C 1/10*** | (2006.01) |
| ***F26B 9/06*** | (2006.01) |
| ***F26B 21/33*** | (2026.01) |
| ***F26B 21/35*** | (2026.01) |
| ***F26B 21/37*** | (2026.01) |

(52) U.S. Cl.
CPC .............. *F26B 21/33* (2026.01); *F26B 21/37* (2026.01); *F26B 21/35* (2026.01); *F26B 2200/06* (2013.01)

(56) References Cited

FOREIGN PATENT DOCUMENTS

| | | | |
|---|---|---|---|
| EP | 2775239 | A2 | 9/2014 |
| GB | 2258468 | A | 2/1993 |
| GB | 2287527 | A | 9/1995 |

OTHER PUBLICATIONS

International Search Report and Written Opinion mailed on Nov. 4, 2022, received for PCT Application PCT/EP2022/072587, filed on Aug. 11, 2022, 15 pages including English Translation.

* cited by examiner

PROCESS FOR ENERGY-EFFICIENT DRYING OF GERMINATED SEEDS AND DEVICE FOR IMPLEMENTATION OF THE PROCESS

CROSS-REFERENCE TO RELATED APPLICATIONS

The present application is based on PCT filing PCT/EP2022/072587, filed Aug. 11, 2022, which claims priority from European Patent Application No. 21190835.5, filed Aug. 11, 2021, the entire contents of each are incorporated herein by its reference.

TECHNICAL FIELD

The invention relates to the field of industrial malt production also known as malting and industrial systems for the industrial production of malt from grain or completely generally of industrial drying kilns for drying materials to be dried (kilning material). In particular, the invention relates to a process for drying green malt in an industrial drying kiln using one or more rotational speed-modulated fan(s), wherein by means of the fan an air mass flow is provided through a bed of drying material of the green malt. Designated as drying kilns are equipment for desiccating and/or drying of foodstuffs and consumer goods by means of heat. Drying kilns are normally subdivided according to the material to be dried, such as, for example, grain drying kilns, malt drying kilns, hops drying kilns but also other drying kilns such as drying kilns for dried fruit, tobacco, prawns, wood drying, seed drying or also linen/flax drying for fiber production (clothing, rope-making). The present invention relates quite generally to energy-optimized drying kilns and kilning processes in the most varied of the areas of application mentioned above. In particular, however, the invention relates to energy-efficient malt drying kilns for kilning of green malt, in which the green malt is stacked up on a stationary or moving floor deck into a layer of specified height through which an air stream, particularly a hot air stream flows, until the layer or partial layer adjacent to the floor deck has reached a predetermined degree of drying, at which point this layer/partial layer is transported away from the floor deck. In the case of a partial layer, the remaining partial layer is held, for example, by diverting to the floor deck and further charged with the air stream. The air stream is then generated by a correspondingly applied fan.

BACKGROUND OF THE INVENTION

Drying kilns are devices for desiccating and/or drying of foodstuffs and other goods, such as, for example, linen or flax, using warmth or heat that have been known for a long time. Typically, drying kilns consist of a spatially-delimited region (kilning room), that is provided with a good flow through of air. For the particular areas of application, the drying kiln comprises a wooden or wire screen with heating option for drying or roasting fruit, seeds, grain, hops or other things. Depending on the area of application, however, the construction of the drying kiln differs. Drying kilns are, therefore, typically subdivided according to the material to be dried, such as, for example, grain drying kilns, malt drying kilns, hops drying kilns but also such as drying kilns for dried fruit, tobacco, prawns, wood drying, seed drying or also linen/flax drying for fiber production (clothing, rope-making). So the malt drying kiln is used for malt production, for example. In malt production, as a third processing step, the green malt is dried on the drying kiln after steeping and germination, which is called kilned. Through the heat and the associated extraction of moisture, malt is not only ready for storage but also obtains its typical (malty) aroma. The malt drying kiln consists of a narrow-meshed wire mesh or a slotted metal plate, what is known as the floor, onto which the green malt is layered. From below, hot air flows through the drying material and thus extracts the moisture from it. The air is typically heated indirectly in modern maltings, by, for example, air heated directly by an oil or gas burner directly dissipating the heat energy via a heat exchanger to the air flowing through the green malt. By indirect firing, the malt remains free of harmful materials and bad aromas from fossil fuels and the formation of nitrosamines is minimized. Direct firing is typically used for the generation of aromatic special malts. So smoked malt, that is used for smoked beer, is generated by a beechwood, rarely also oakwood, fire under the drying kiln. For the production of whisky malt, peat is fired under the drying kiln which lends the malt and the whisky produced from it a phenolic note. Recently, beers are also increasingly produced with whisky malt. Another example is the hops drying kiln. Hops have a water content of 75-84% when harvested and must be dried directly after harvesting to a moisture content of 9-10% to retain its storability. Depending on the type and scaling of the drying kiln, the drying time is approximately 3-5 hours. For an optimum drying result, a drying temperature of 62-68° C. is endeavored on the hops drying kiln, with a fill height of 20-35 cm and an air speed of 0.30-0.45 m/s. In a further example, the grain drying kiln, kiln-drying is also primarily for preservation. As grain is only able to be stored securely at below 14% moisture, depending on weather, but also threshed with a higher moisture, the moisture must be extracted by drying. If storage were to be done too moist, the result would be infestation with fungi and pests. The moisture in the grain can also cause spontaneous combustion. In the later grinding of the grain, however, it may be necessary to wet this depending on the vitreosity of the individual grains back to 16-17% moisture, in other words, moisten, as the dry husks split too much when grinding, and separation between bran and flour would be made more difficult. Another desired effect of kilning grain may be the production of the roasting aroma when roasting the grain. A known product, which retains its typical aroma due to kilning is green spelt, spelt grain that is harvested semi-ripe and is artificially dried immediately afterwards. As discussed above, kilning, therefore, has a great significance in the industrial production of foodstuffs, but also in other industrial goods that need a drying or desiccation process.

In the preparation of malt, the process particularly comprises the following three processes, being (i) steeping, which for starting germination, consists of bringing out and steeping in steeping tanks, addition of seeds and water and then transport of the wet germination material into malting boxes, (ii) germination of the grain (sprouting of the seed), and (iii) kilning, i.e. the end of germination by water extraction as an artificial intervention into the germination process. The last step is done by means of malt kilns. In malt kilns for kilning of green malt, in which the green malt is stacked up in the kilning room on a stationary or moving floor deck into a layer of specified height through which an air stream, particularly a hot air stream flows, until the layer or partial layer adjacent to the floor deck has reached a predetermined degree of drying, at which point this layer/partial layer is transported away from the floor deck. In the case of a partial layer, the remaining partial layer is held, for example, by diverting to the floor deck and further charged with the air stream. The air stream is typically then generated by a correspondingly applied fan, the kilning fan. The floor deck is air- and/or gas-permeable, consisting of, for example, a narrow-meshed wire mesh or a slotted metal sheet. The kilning processes known in the prior art for malt preparation run, for example, batchwise, by batch after batch being handled on the floor deck in the kilning room one after the other. In this case, each batch is brought into the form of a green malt layer typically uniformly onto the floor deck and kilned there up to a specified level of dryness. The finished kilned malt is then cooled and subsequently cleared from the floor deck and transported away. Usually, an average target moisture of the malt grains of the finished kiln-dried malt of 4 to 5% is output. Of course, other target moistures may also be defined.

The usage of rotational-speed-modulated fans to generate an air mass stream through the bed of drying material of the green malt on the floor deck of drying kilns, particularly malt drying kilns, is known. In so doing, a heated air mass stream is directed by means of a fan through the drying bed, so that moisture is extracted from the drying material. On the downstream side, the air mass flow is saturated in a first phase with moisture typically approaching 100%, until the drying material has reached a moisture content of the drying material of about 20% or less, then a further drying phase follows until a preset residual moisture of the drying material is achieved. For the fans, depending on the construction of the drying kiln, the usage of fans of different construction are known. Designated as fans are flow devices to advance air and build up pressures. Typically, axial fans are used for low and medium pressures, whereas radial fans are used to generate higher pressures. Axial fans for generating high conveying volume and lower pressures are typically characterized by long blades and lower hub diameters. If high pressures are to be built up with axial fans, rotors with large hub diameters are required. The drive motors may either be integrated into the rotor hub (external rotor motors) or motors with, for example, flanged-on blades can be used. Radial fans are, for example, known as housing fans or as free-running wheels. Basically, rotors with vanes bent forwards for high conveying volume at medium pressures and low sound levels, and rotors with vanes bent rearwards for high pressures in special applications can be differentiated. The drive of the rotors can be done, for example, directly or with vee-belts. Typical parameters for selection of a fan are the volume flow to be achieved ($m^3/h$), the static pressure height (Ps in Pa), the sound (db (A)) and/or the temperature. To provide a volume flow and build up pressure, mechanical, electrical and flow-related losses occur in the fan that contribute to a corresponding energy efficiency of a fan.

The green malt consists of germinated grains from seeds, such as cereals, pseudo-cereals, legumes or similar, particularly, for example, barley, rye or wheat, which is, for example, kept in an enclosed region by steeping and germinating. Generally, the process relates to germinated grain where it is obtained from germinitive, bio-active grain by steeping and germinating, wherein the steeping may also be undertaken multiple times. In the malting process, in steeping and germinating in an appropriate production time, typically as good as possible malt qualities at as high as possible weight yield are endeavored. The green malt is then dried or even kilned in the conventional, industrial malting systems on floor drying kilns from a drying material moisture of around 38-46% to a desired final product moisture of around 3%-6%, at which the germination process is finished. The intention of this drying is primarily to make the malt able to be stored and by the water extraction, have an effect on various material changes in the malt. For this purpose, the heated drying gas is directed by means of ventilation through the green malt, which can be layered onto one or more floor above each other. What is usual here is to use ambient air as the drying gas, which is heated by an upstream heating system. Another known possibility consists of directing combustion gases mixed with ambient air directly through the green malt.

For the process of drying, kilning, of malt, which, for example, is used for beer production, it is of considerable significance not only to achieve a targeted drying of the green malt, but also to affect certain malt properties by a defined temperature control of the drying air, which contribute to determining the quality and flavor of the end product in the later brewing process. As well as these technological requirements, the economic parameters are to be considered, so that the kilning process runs as rationally as possible both in terms of energy production and extent of operation. In addition, prerequisites have to be created to be able to integrate energy-saving components optimally into the corresponding systems.

This task is solved according to the individual assessment of the economic and technological boundary conditions in the prior art with varying kilning systems. For example, single-deck and double-deck kilning, but also continuous kilning are known. As well as these, purely static systems, considered from the drying material, in the years of high energy prices, dynamic systems with continuous malt conveying, have also been developed. These three types of drying kiln are described in detail in the prior art, for example, in "Die Technologie der Malzbereitung (Malt Preparation Technology)" by the authors Schuster/Weinfurtner/Narziss or such as described in detail in the patent DE A-3224471.109.

The factors contributing to determining the kilning process are in particular the drying material mass, the moisture content of the drying material, the temperature of the ambient air used, particularly of the supply air, the moisture of the ambient air used, particularly the supply air, the temperature of the heated drying air, the temperature of downstream side, i.e. exhaust air side, air mass flow, the moisture of the downstream side air mass flow, particularly absolute outflow moisture during withering, and the mechanical power of a fan driving this air mass flow.

As discussed above, the working steps below are part of malt production: (1) Pre-drying the grain; for a storage of the grain, the moisture content contained therein must not exceed the value 15%, so that it may be necessary that the grain is to be dried before putting into storage. Such a drying process may be undertaken by ventilating a grain silo. Of course, harvesting of the grain at a desired moisture content can also be determined, by which the pre-drying step in question here does not then have to be provided; (2) Steeping the grain; for steeping, the grain is moistened in such a way that the moisture content of the grain increases by up to 46%. The working step of steeping generally lasts 1 to 2 days, in which the consumption of electrical energy of the process systems involved is small compared with the following process steps for drying; (3) The germination of the grain; the steeped grain germinates within 3 to 5 days at a moisture content of approximately 38 to 46%, wherein, by means of air moisture and/or spraying on of water, this moisture content is guaranteed for the duration of this working step and uniform germination results by regularly turning the germination material. The electrical energy consumption in the present germination working step may be higher than in the previous steeping, but is much more considerably lower than in the following process steps for drying. As a result, after germination, what is known as green malt is present, which is not storable as such; and (4) Drying the grain (kilning), i.e. in malt production drying the green malt in a drying kiln to guarantee a possible, subsequent storability or even a transportability. The colorants and aromatic materials typical of malt are formed when kilning. In the kilning working step, the green malt is dried from a moisture content of 38 to 46% to a single-figure value of 3 to 8%. This happens in two sub-steps: during the first drying section, withering, the temperature of the exhaust air remains relatively constant, wherein the outflowing air of the drying kiln is saturated virtually 100% with moisture. The heat energy needed for withering essentially is used to dilute the moisture on the surface of the grain of the green malt, under the husk and in the easily-accessible outer layers of the grain, wherein the enzymes present in the germ buds are preserved. In the second phase, curing, the temperature also rises considerably inside the grain and the water is further and further extracted through the capillary effect. The downstream side air of the drying kiln is no longer saturated 100% with moisture at this stage. The temperature level and the duration of this second phase are decided based on the malt color. The higher the temperature selected, the longer the curing lasts, the darker the malt or even the malt grains are as a result of the malting process.

The various consumption values when drying malt therefore stem from the drying process being subdivided into two phases for technological reasons, which are essentially differentiated by differing supply air temperatures. Green malt for brewing purposes comes into the drying kiln with a water content of 38-46% and is to be dried in the first phase, known as withering, at mild ratios at temperatures of about 60° C. to a water content of about 20% or less. In this phase, the surface of the grain of the malt remains moist, so that the kilning air leaves the malting bed practically saturated with the water vapor. Depending on type of drying kiln, this section may last 10 to 24 hours and be characterized by a optimum usage of the drying potential of the kilning air. In the second phase, known as curing, a water content in the finished malt of below 3-8% is achieved, in which, during the last few hours, for technological reasons in turn, the kilning air is to be between 80 to 90° C., in many cases up to 110° C. The insufficient exploitation of the drying potential thus existing is shown by a marked temperature increase in the kilning air consumed. In other words, if the exhaust air temperature at the end of the withering period is still at 28° C. then at the end of the curing phase, it increases to values of between 70 and 80° C.

In the "drying" working step, the greatest energy consumption is normally needed, firstly in the form of heat energy for the inflow side air for kilning and secondly in the form of electrical energy for ventilation for this air through the drying kiln. In this case, the quantity of electrical energy needed for the fan is particularly significant, as the air mass flow of the air is known to be the third power (cube) of the energy consumption ($RPM \approx P^3$ where RPM=Revolutions Per Minute, on other words, 60 rpm=1 $s^{-1}$ in units of the rotational speed n), but wherein this air mass flow only exhibits a linear dependency on the rotational speed of a fan ($RPM \approx V_{air}$). This means that, for example, a reduction in rotational speed n of the fan from 100% to 90% may mean a reduction of fan power consumption by 27%, or a reduction of the speed from 100% to 80% may result in a reduction of the fan power consumption of around 49%. Nevertheless, it is to be noted that although a reduction of the fan rotational speed reduces the fan power consumption by 49%, due to the extension of the withering time, the reduction of power does not lead through to a 1:1 energy consumption saving for the entire process. In the example listed (reduction of the fan power consumption by 49%), the reduced fan power consumption, considering the extended withering period, reduces the entire electrical energy requirement of the fans by 39%. In other words, it is typically simpler to specify the reduction of the fan power, as this can be calculated directly, wherein it is to be noted, however, that the energy requirement will drop less due to the relationship mentioned above ($RPM \sim V_L$; $RPM \sim t$; $RPM \sim P^3$). Basically, however, the moisture content of below 10%, for example, 3-8% or below 5% of the malt grains is a decisive final target after kilning.

As illustrated in FIG. 1, the many drying kilns typically operate in a certain rhythm (for example, 20 h, 24 h, 32 h, 36 h or 48 h etc.). In other words, every day at about the same time the entire quantity of green malt to be kilned is loaded onto a floor (only applies to a multiple of 24 h, as otherwise the start and end of the kilning process migrate accordingly), whereas previously the pre-dried (withered), then completely dried (kilned) and finally cooled malt has been unloaded. The various phases in FIG. 1 comprise (i) loading 2-3 h, (ii) withering 8-12 h, (iii) heating-up 3-4.5 h, (iv) curing 3.5 h, (v) cooling 0.5-2 h, and finally (vi) unloading 2-3 h. In double-deck drying kilns it is to be mentioned that, in the case of a double-deck drying kiln operated at a 24-hour rhythm, every day at about the same time, the entire quantity of green malt to be kilned is loaded onto a floor, whereas the other second floor is provided with the pre-dried (withered) malt from the previous day for completely drying (curing). In this way, one batch is kilned in the 2×24=48 hour cycle. Of course, this has the prerequisite that each floor can take the same full quantity of green malt. FIG. 2 shows another kilning scheme of a continuous single-deck drying kiln of the prior art. In this case, the temperature below the floor is continuously increased until the desired moisture content of 3 to 8% of the malt grains is achieved. It is to be mentioned that for double-deck drying kilns other possibilities than those mentioned above, exist, for example, that the material remains on the floor on which it is and instead of reloading onto the second floor, the air flow is switched over and reverses from the first floor to the second floor. The present invention, however, can be applied, regardless of the selected kilning option, therefore relating to both single-deck kilning and also all possible double-deck kilning, particularly when it is operated at a certain rhythm.

As FIG. 3 further shows, the entire process time of kilning changes with the selected rotational speed of the fan. In the case where the rotational speed n=100%, the kilning time t is shorter than for a reduced rotational speed n=90%. For example, the case is also listed here, at which a maximum kilning time $t_{max}$ specified on the part of the industrial malting system is then precisely achieved, if during withering, heating up and curing, the fan is only operated with a rotational speed of n=80%; in this case, the saving mentioned above of around 39% in electrical energy for the fan is achievable. So, although lowering the rotational speed for the fans used to values less than 100% is conceivable, to reduce energy consumption, this would result in the trade-off that the working step of kilning, with a view to the endeavored moisture content of 3 to 8% of the malt grains would entail a corresponding extension of this working step, which would mean a corresponding additional time spent and could therefore counteract other boundary conditions of the industrial malting systems. It is to be added that a reduction in fan power or even its rotational speed does not necessarily have to be endeavored as a constant reduction but, for example, dependent on boundary parameters such as measured fluctuating product start and end moistures, changing weather conditions, quality measurement parameters and/or unwanted process extensions etc. The further boundary conditions of such malting systems also include the storage capacity for the grain, the germination time, and the maximum possible drying time and/or kilning time comprising loading the drying kiln, withering, heating up, curing and unloading. In so doing, this drying time is furthermore determined by system-typical or system-specific loading times of the drying kiln and the maximum possible drying time, resulting in a latest unloading time of the drying kiln, until which the drying kiln must be freed up again for a subsequent malt batch. It is to be noted that, generally, not only is the drying kiln fixed in time in these processes, but also the upstream process steps such as steeping and germination, for example. The energy saving possible by reduction of the fan rotational speed is therefore dependent on the maximum possible, system-specific drying time and the relevant times for loading and unloading, and indeed with the specified basic condition of the resulting moisture content of the malt grains and/or what is know as the kilning malt.

Table 1 illustrates schematically a process scheme of a single-deck high-performance drying kiln in 24 h rhythm, in this example for the production of Pilsener malt (example). The process scheme of table 1 may also be used as an example control GUI (Graphical User Interface) of a drying kiln of the prior art comprising (i) static control: manual adjustment of the FAN speed while curing, (ii) triggering the next process step when predefined thresholds are reached, and (iii) withering at a constant fan speed of 100%. In the present example, the total time is 23.5 h and the drying time is 18 h.

only a limited adjustable reduction in the consumption of electrical energy. Even if—as proposed above—the rotational speed modulation of the fan may involve a reduction in the consumption of electrical energy then, therefore, no optimized consumption can be achieved over the total drying time.

Document GB 2 287 527 A discloses a method for energy-efficient drying of germinated seeds in a drying kiln that exhibits a rotational speed modulation based on the moisture content of the drying material. Furthermore, DE 34 07 685 C1 describes a process of drying germinated seeds in a drying kiln using a fan to direct an air mass flow through a bed of drying material, wherein the drying is undertaken for a specified maximum kilning time (15 hours). Finally, documents US 2020/263923 A1 and US 2015/354895 A1 describe a process for energy-efficient drying of grain in a furnace using a fan to direct air mass flow through a bed of drying material. In so doing, the grain moisture content is detected as well as an ambient air humidity of an ambient air used for the air mass flow. While drying, a moisture content of the drying material is monitored up to a specified limit.

SUMMARY OF THE INVENTION

It is a task of the present invention to provide a process for as energy-efficient as possible drying of green malt or even a drying kiln for implementation of energy-efficient drying of green malt, by which the disadvantages mentioned above known from the conventional malting systems are remedied. In particular, it is a task of the invention to provide a consumption optimization with respect to the consumption of electrical energy, particularly in relation to the regulation of the air mass flow by means of ventilation through the bed of drying material.

According to the present invention, these objects are achieved in particular with the characteristics of the inde-

| | Process step | | | | | | | |
|---|---|---|---|---|---|---|---|---|
| | 0 | 1 | 2 | 3 | 4 | 5 | 6 | 7 |
| | Process section | | | | | | | |
| | Loading | | Withering | | Heating up | Curing | Cooling | Unloading |
| Max. total duration (h) | 2 | 1 | 12 | | 2.5 | 3 | 1 | 2 |
| Max. step duration (min) | 120 | 60 | 180 | 540 | 240 | 60 | 60 | 120 |
| Min. step duration (min) | — | 60 | 150 | 360 | 240 | 45 | 30 | — |
| Process temperature (° C.) | — | 55 | 55 | 60 | 85 | 85 | 0 | — |
| Advance criterion Exhaust air temperature (° C.) | — | — | — | — | — | — | <50 | — |
| Advance criterion Exhaust air moisture (%) | — | — | — | <80 | — | — | — | — |
| Fan rotational speed (%) | — | 60 | 100 | 100 | 75-100 | 50-70 | 100 | — |
| Proportion of feedback air (%) | — | 0 | 0 | 0 | 25-50 | 50-75 | 0 | 0 |

From document GB 2 287 527 A, a method for malting grain and a relevant malting system is known, wherein in the working step of drying in the drying kiln, the necessary air mass flow through the bed of drying material is provided depending on the air humidity recorded downstream, meaning that by means of a rotational speed modulation of a fan for this air mass flow, this is done such that a reduction in the consumption of electrical energy for the fan used can be achieved. On the other hand, it remains concealed in this present prior art that due to solely modulating the rotational speed depending on the downstream air humidity can mean pendent claims. Moreover, further advantageous embodiments can be derived from the dependent claims and the associated descriptions.

In accordance with the present invention, the objects mentioned above for a drying kiln and corresponding process for energy-efficient drying of green malt in a drying kiln using a rotational speed-modulated fan for directing an air mass flow through a bed of drying material of the green malt is achieved by drying being implemented during a specified maximum kilning time ($t_{max}$) that a grain moisture content (Hg) and a grain mass (Mg) of a grain are detected, which constitutes a basis for the bed of drying material of the green malt after steeping and germinating, that an ambient air humidity (Hl/Hla) of an ambient air used for the air mass flow is detected, that a plurality of weather forecast data (W1, W2) are detected, at least with respect to the ambient air humidity (Hl/Hla), that a moisture content of the drying material (Ht) of the green malt is monitored during drying up to a specified limit (Gt), and that based on the grain moisture content (Hg), the grain mass (Mg), the ambient air humidity (Hl/Hla), the plurality of weather forecast data (W1, W2) with respect to the ambient air humidity (Hl) and based on the moisture content of the drying material (Ht) of the green malt (2), a rotational speed modulation of the fan is done in such a way that the specified maximum kilning time ($t_{max}$) is achieved and/or maintained. The ambient air humidity (Hl) includes the absolute humidity. The ambient air humidity (Hl) only comprises the relative humidity, the air temperature is also to be detected as a weather forecast so that, together with the forecast relative humidity, the forecast absolute humidity can be generated by means of the device. To differentiate from relative and absolute exhaust air humidity is to be added, that the absolute humidity describes the total quantity of water contained in a certain spatial volume. The absolute humidity is mostly specified in grams per cubic meter (g/m$^3$). Air at a temperature of 30° C. can take 31 grams of water per cubic meter (31 g/m$^3$), whereas air at a temperature of 5° C. can only take 7 grams of water per cubic meter (7 g/m$^3$). The relative humidity, on the other hand, gives information on by how many percent the air is saturated with water (vapor). It is basically true that: the hotter the air temperature, the more water it can take. At 100% relative humidity, the air is completely saturated with water (vapor). At 50% relative humidity, the air is half saturated with water (vapor). If 100% relative humidity is exceeded, the excessive moisture is converted into water of condensation. With regard to the absolute exhaust air humidity during withering, the system according to the invention can implement both a forecast of this exhaust air humidity based on the weather data and exhaust air humidity at the start of kilning. Alternatively, it may comprise a firmly adjustable or otherwise pre-definable empirical value.

By the maximum kilning time, here is to be understood the total dwell time of a drying material in a drying kiln, wherein the kilning time comprises the working steps of withering, heating up, curing and cooling between loading and unloading the drying material into or out of the drying kiln. Loading and unloading, as well as cooling, are essentially determined by the mass and/or volume of the drying material, wherein the cooling particularly typically is also considerably dependent on the parameters of the condition of the outside air, such as temperature; other factors affect the loading and unloading times or even cooling only slightly so that these times are hardly able to be affected with regard to a specified maximum kilning time or an optimization of energy consumption. The working steps of withering, heating up and curing implemented one after the other are accordingly decisively influenced by the boundary conditions mentioned above, in other words, by the grain moisture content, the grain mass, the ambient air humidity, the plurality of weather forecast data with respect to the ambient air humidity and the moisture content of the drying material of the green malt, wherein this moisture content of the drying material of the green malt determines the process times for withering, heating up and curing decisively. It is to be pointed out that, in a first step for energy optimization, only the withering part can ever be considered as a time-variable part, wherein the heating and kilning are considered as fixed in time. As a design variant, for energy optimization, the entire process comprising withering, heating up and kilning may also be included.

The invention has the advantage, among other things, that a rotational speed modulation of the ventilation through the drying material can be used in such a way that, by maintaining the endeavored moisture content of the drying material of the green malt, the entire kilning time can be exploited as much as possible and/or maintained and therefore the energy efficiency of the device is optimized. That means that the rotational speed of the fan for the necessary air mass flow during withering, heating up and curing is modulated in such a way that, when reaching the end of the specified maximum curing time, the required moisture content of the drying material of the green malt is present. As already mentioned, as an embodiment variant, the modulation of the rotational speed may happen only when withering. For further optimization, for example, heating up and/or curing may be included in the modulation. Therefore, the times for the working steps of withering, heating up and curing are extended which means that a rotational speed reduction of the fan is made possible for the air mass flow and therefore a marked saving in electrical energy. Furthermore, it is advantageous that the present consumption optimization, as well as simple reduction in consumption, also delivers its distribution of consumption over time, in other words, the distribution of consumption of electrical energy over the—aforementioned—maximum possible, system-specific drying time or even kilning time, by which the electrical consumption smooths over all the working steps in industrial malting systems which, in the end, also means a more sustainable handling of resources. Savings in electricity or savings in power consumption of the fan by the present invention are clear. However, other savings are made from energy consumption by the invention, particularly, for example, thermal energy savings as, for example, cooling of the system is prevented by better exploitation of time, or savings arising due to the higher specific heat exchanger area with reduced volume flows. Furthermore, by means of the process according to the invention, a forecast with respect to the time distribution of the energy consumption, particularly during the working step of withering, heating up and curing is possible. Such energy consumption forecasts are currently also linked to significant economic aspects, by which significant incentives are created to smooth and/or reduce the energy consumption sustainably. In the end, the boundary conditions at a relevant usage site for the industrial malting system that is used, play a pertinent role; these boundary conditions include energy supply contracts with negotiated peak consumption values, just as the regionally individual, climatic circumstances of the environment or the intrinsic properties of the grain to be malted itself. A further advantage of the respective exploitation of the maximum kilning time can be seen in industrial malting systems, in that this cools down less due to the shorter downtimes between batch changes, and therefore a residual heat remains in the malting system due to the considerable heat capacity and therefore the energy consumption reduces for a necessary heating up of the malting system at the start of a next kilning phase.

BRIEF DESCRIPTION OF THE DRAWINGS

The present invention is explained in more detail by means of examples with reference to the drawings in which is shown:

FIG. 3 shows three cases, in other words, an initial situation (case 1 (initial)), a case 2 and a case 3. In the initial situation, the fan is operated at 100% rotational speed, the withering time for which is 10 hours (withering time=10 h) and the total kiln time is 17 hours (total kiln time 1 h), wherein in the energy consumption is 5 500 $kWh_{el}$. In case 2, the fan is operated at 90% rotational speed, the withering time for which is 11 hours, the total kiln time is 18 hours, and the energy consumption is 4 455 $kWh_{el}$. This corresponds to a reduction of energy consumption by ~19% of the total electrical energy consumed by the fan, wherein the power consumption of the fan is lowered by 27%, but the withering time and the kiln time are extended by 1 h each. In case 3, the fan is operated at 80% rotational speed, the withering time for which is 12 hours and the total kiln time is 19 hours, wherein the energy consumption is 3 420 $kWh_{el}$. This corresponds to a reduction of energy consumption by ~38% of the total electrical energy consumed by the fan, wherein the power consumption of the fan is lowered by 49%, but the withering time and the kiln time are extended by 2 h each. Case 3 corresponds to the maximum possible extension of the kiln time within the process, without fixed provided times of the process steps, particularly the kiln time, being affected. In other words, the longer kiln times reduce the energy consumption at lower fan rotational speeds. The device and process according to the invention therefore allow the fan rotational speeds to be adjusted so that an optimal exploitation of the kilning phase available is achieved at the maximum possible time.

DETAILED DESCRIPTION OF PREFERRED EMBODIMENT VARIANTS

Figure 7:
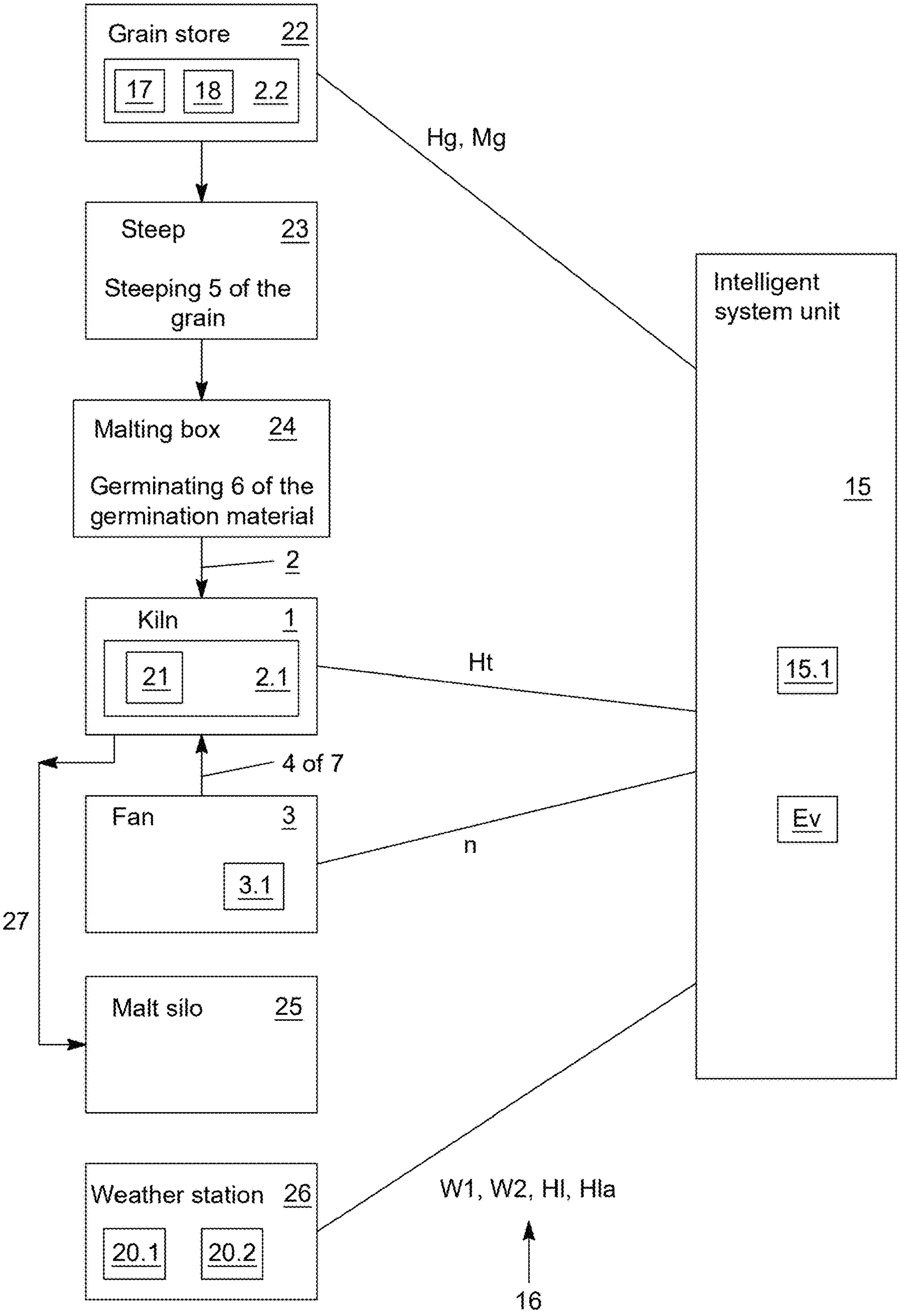
FIG. 7 illustrates schematically an architecture of a possible realization of an embodiment variant for energy-efficient drying of green malt 2 in a drying kiln 1 using a rotational speed-modulated fan 3 for directing an air mass flow 4 through a bed of drying material 2.1 of the green malt 2. In this case, drying is implemented for a specified maximum kiln time ($t_{max}$).

FIG. 7 illustrates schematically an architecture of a possible realization of an embodiment variant for energy-efficient drying of green malt 2 in a drying kiln 1 using one or more rotational speed-modulated fans 3 for directing an air mass flow 4 through a bed of drying material 2.1 of the green malt 2. In this case, drying is implemented for a specified maximum kiln time ($t_{max}$).

A grain moisture content (Hg) and a grain mass (Mg) of a grain 2.2 are recorded. The grain 2.2 constitutes, after steeping 5 and germinating 6, a basis for the bed of drying material 2.1 of the green malt 2. By means of measuring sensors, an ambient air humidity (Hl) of an ambient air 7 used for the air mass flow 4 is detected. In, addition, for example, an absolute ambient air humidity (Hla) of an ambient air 7 used for the air mass flow 4 may be detected.

The weather measurement data are detected by means of measuring stations. Based on the weather measurement data, a plurality of weather forecasts (W1, W2), at least with respect to the ambient air humidity (Hl) is detected or generated. The plurality of weather forecast data (W1, W2) may, for example, be generated or detected, for example, at least with respect to the absolute ambient humidity (Hla). The plurality of weather forecast data (W1, W2) may, for example, be generated or ascertained continuously, in other words, dynamically, with respect to the absolute ambient air humidity (Hla) for the 12 hours following on from loading 8 the drying kiln 1 and/or from the start of the fan of the drying kiln. The term "from loading the drying kiln" may include or have the prerequisite in this patent, that the loading has been completed. The reason for this is that for certain embodiment variants already before the end of loading, for example, from half the loading time, the fan has already started and drying has already begun, so as not to lose any time. While drying, a moisture content of the drying material (Ht) of the green malt 2 is monitored up to a specified limit (Gt). The limit (Gt) of the moisture content of the drying material (Ht) of the green malt may, for example, be maximum 3-8%, for example 5%. Other values are also possible. For example, the target water content may also be defined after the withering phase, for example, in a range of 12-20%.

Based on the moisture content of the grain (Hg), the grain mass (Mg), the ambient air humidity (Hl), the plurality of weather forecasts (W1, W2), with respect to the ambient air humidity (Hl) and based on the moisture content of the drying material (Ht) of the green malt 2, a rotational speed modulation of the fan 3 is undertaken in such a way that the specified maximum kiln time ($t_{max}$) is reached and/or maintained. Detecting the moisture content of the grain (Hg), the grain mass (Mg), the ambient air humidity (Hl), the plurality of weather forecast data (W1, W2) with respect to the ambient air humidity (Hl) and the moisture content of the drying material (Ht) of the green malt (2) may, for example, be done by means of an intelligent system unit 15 of the kiln, with which the rotational speed modulation of the fan 3 is done in such a way that the maximum kiln time ($t_{max}$) is reached and/or is maintained, and an energy consumption forecast (Ev) is ascertained.

Figure 1:
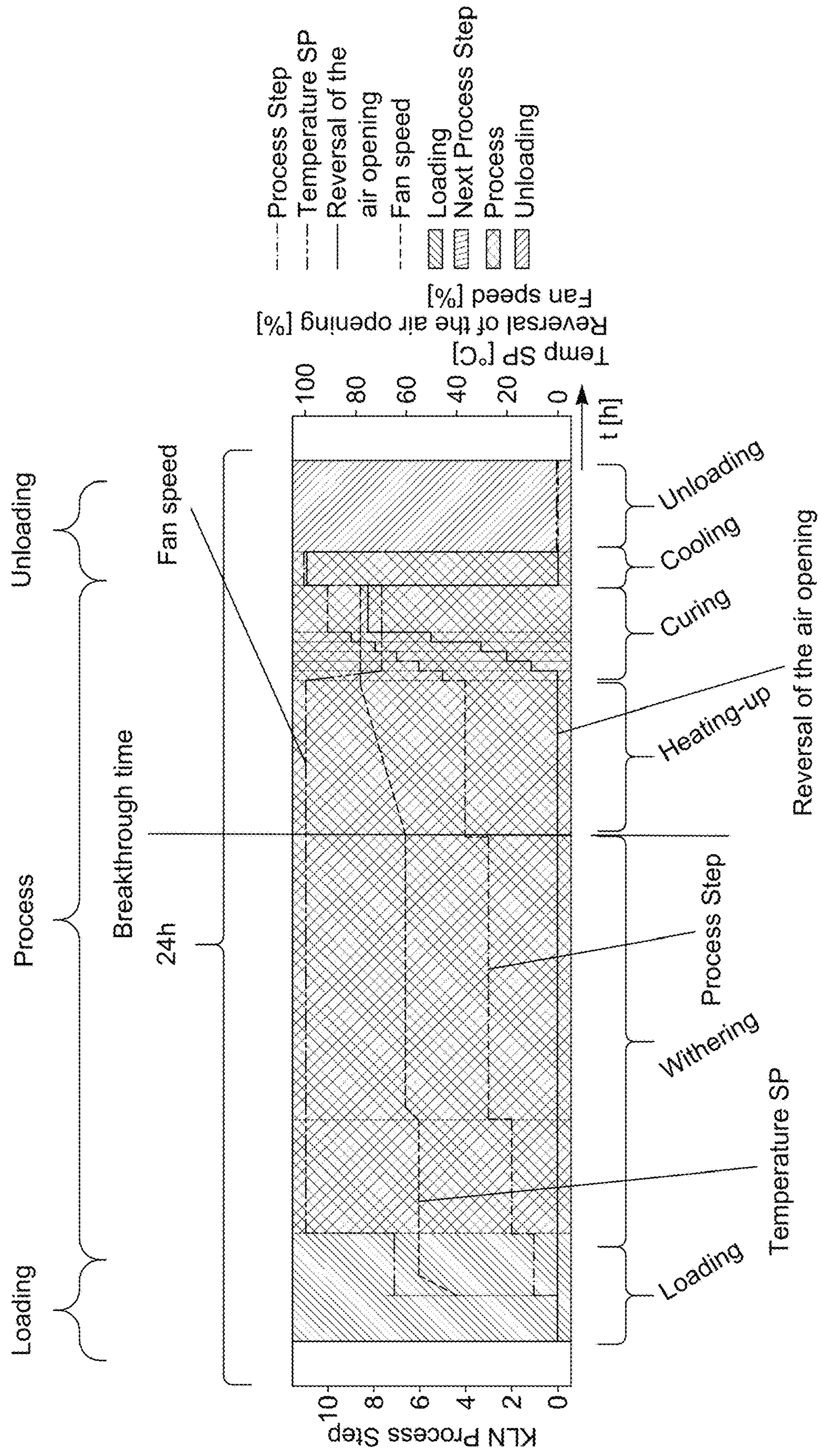
FIG. 1 shows a diagram that illustrates, for example, how many drying kilns are typically operated in a certain rhythm (for example, 20 h, 24 h, 32 h, 36 h or 48 h etc.). In other words, every day at about the same time the entire quantity of green malt to be kilned is loaded onto a floor, whereas previously the pre-dried (withered), then completely dried (kilned) and finally cooled malt has been unloaded. The various phases in FIG. 1 comprise (i) loading 2-3 h, (ii) withering 8-12 h, (iii) heating-up 3-4.5 h, (iv) curing 3.5 h, (v) cooling 0.5-2 h, and finally (vi) unloading 2-3 h. In double-deck drying kilns it is to be mentioned that, in the case of a double-deck drying kiln operated at a 24-hour rhythm, every day at about the same time, the entire quantity of green malt to be kilned is loaded onto a floor, whereas the second, other floor is provided with the pre-dried (withered) malt from the previous day for completely drying (curing). In these cases, in this way, one batch is actually kilned in the 2×24=48 hour cycle. Of course, this has the prerequisite that each floor can take the same full quantity of green malt. It is to be mentioned once again that, for double-deck drying kilns, other possibilities than those mentioned above exist, for example, that the material remains on the floor on which it is and instead of reloading onto the second floor, the air flow is switched over and reverses from the first floor to the second floor. The present invention, however, can be applied, regardless of the selected kilning option, therefore relating to both single-deck kilning and also all possible double-deck kilning, particularly when it is operated at a certain rhythm.
Figure 2:
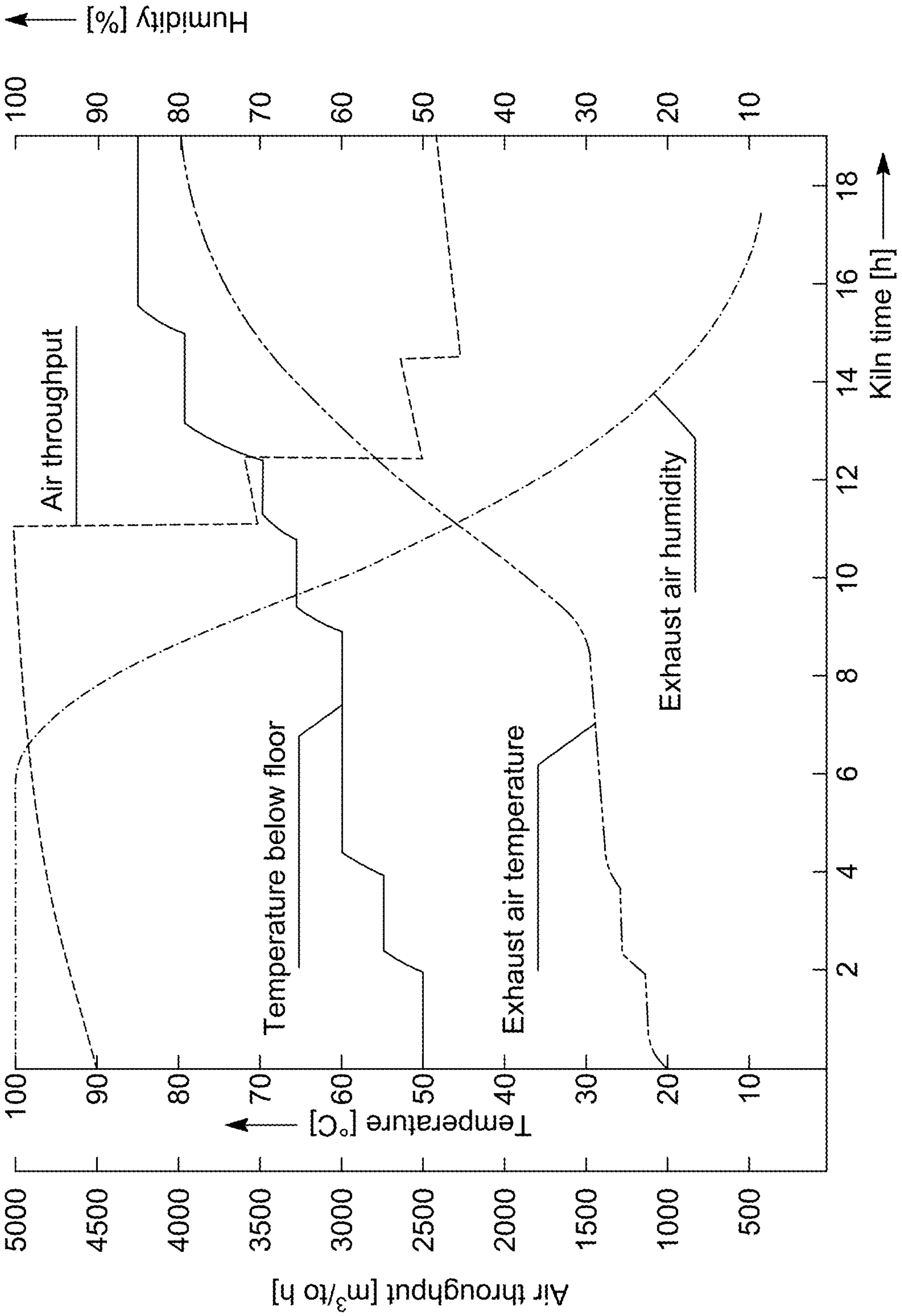
FIG. 2 shows an example diagram that illustrates schematically another kilning scheme of a continuous single floor drying kiln of the prior art. In this case, the temperature below the floor is continuously increased, or in steps, for example, in time intervals, until the desired moisture content of 3 to 8% of the malt grains is achieved. Withering 2 h at 50° C. and 2 h at about 57° C. and curing for about 5.5 h at 62° C., about 2 h at 68° C., about 1.5 h at 72° C., about 2 h at 80° C. and about 4 h at 85° C., in other words, up to an exhaust air temperature of approximately 80° C. Heating up for about 4 h from 65 to 80° C., curing for about 5 h at 80-85° C. That produces a total duration of the kilning process, in other words, of withering and kilning of 19 h. As mentioned for kilning, the green malt is dried from a moisture content of 38 to 46% to a single-figure value of 3 to 8%. This happens in the two withering and curing sub-steps: during withering, the temperature of the exhaust air remains relatively constant (see FIG. 2), whereas the outflowing air of the drying kiln is saturated virtually 100% with moisture. In the second phase, curing, the temperature also rises considerably inside the grain and the water is further and further extracted through the capillary effect. The downstream side air of the drying kiln is no longer saturated 100% with moisture at this stage (see FIG. 2).
Figure 3:
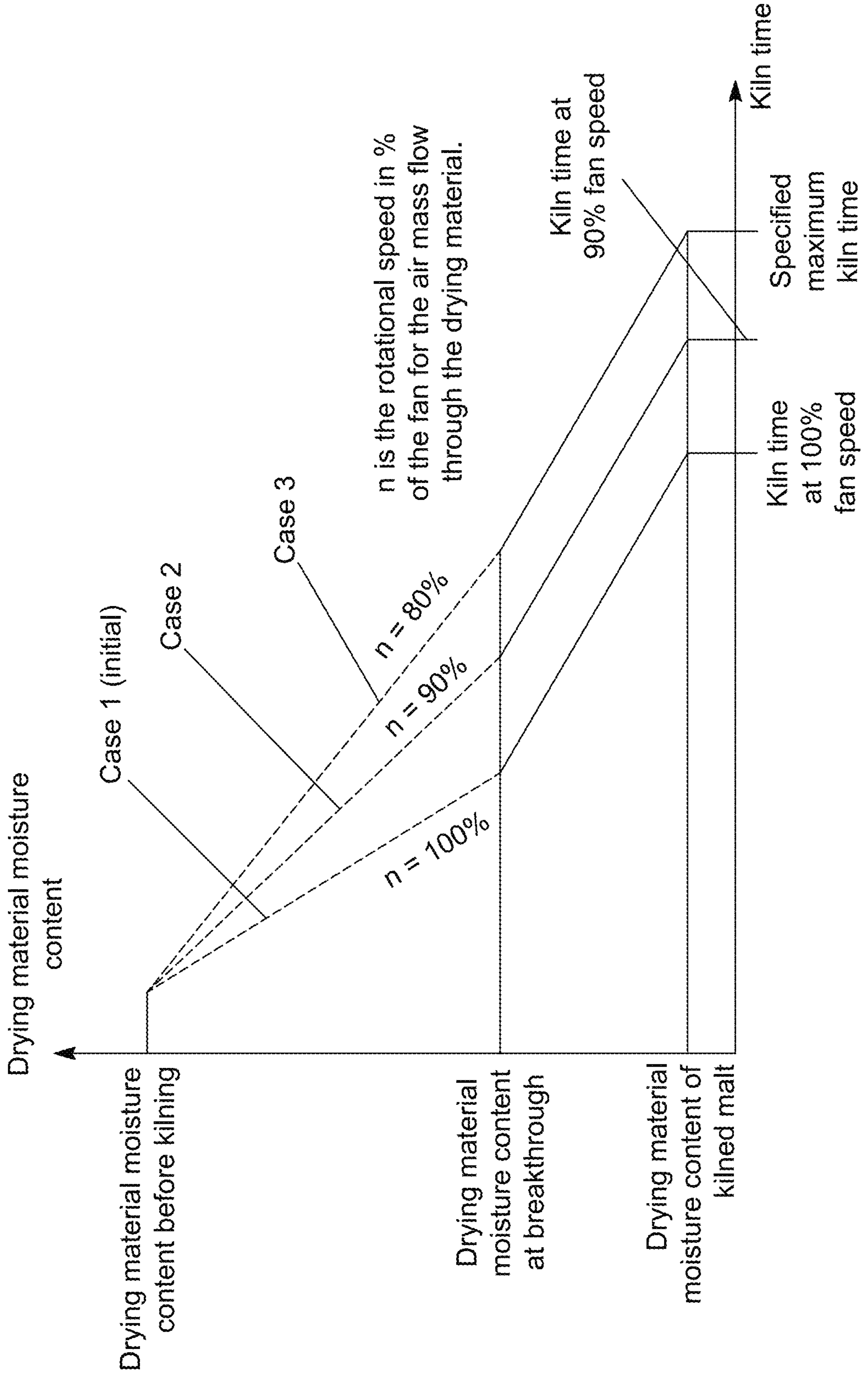
FIG. 3 shows an example diagram that illustrates schematically how the entire process duration of kilning changes with the selected rotational speed of the fan. In the case where the rotational speed n=100%, the kilning time is less than for a lower rotational speed n=90%. For example, the case is also listed here, in which a maximum kilning time specified on the part of the industrial malting system is then precisely achieved, if during withering, heating up and curing, the fan is only operated with a rotational speed of n=80%; in this case, the saving mentioned above of around 39% in electrical energy for the fan is achievable. In turn, it is to be noted that although a reduction of the fan rotational speed reduces the fan power consumption by 27% or even 49%, due to the extension of the withering time, the reduction of power does not lead through to a 1:1 energy consumption saving for the entire process. In the example listed (reduction of the fan power consumption by 49%), the reduced fan power consumption, considering the extended withering period, reduces the entire electrical energy requirement of the fans by 39%. In other words, it is typically simpler to specify the reduction of the fan power, as this can be calculated directly, wherein it is to be noted, however, that the energy requirement will drop less due to the relationship mentioned above (RPM~$V_L$; RPM~t; RPM~$P^3$). Basically, however, the moisture content of below 10%, for example, 3-8% or below 5% of the malt grains is a decisive final target after kilning.
Figure 4:
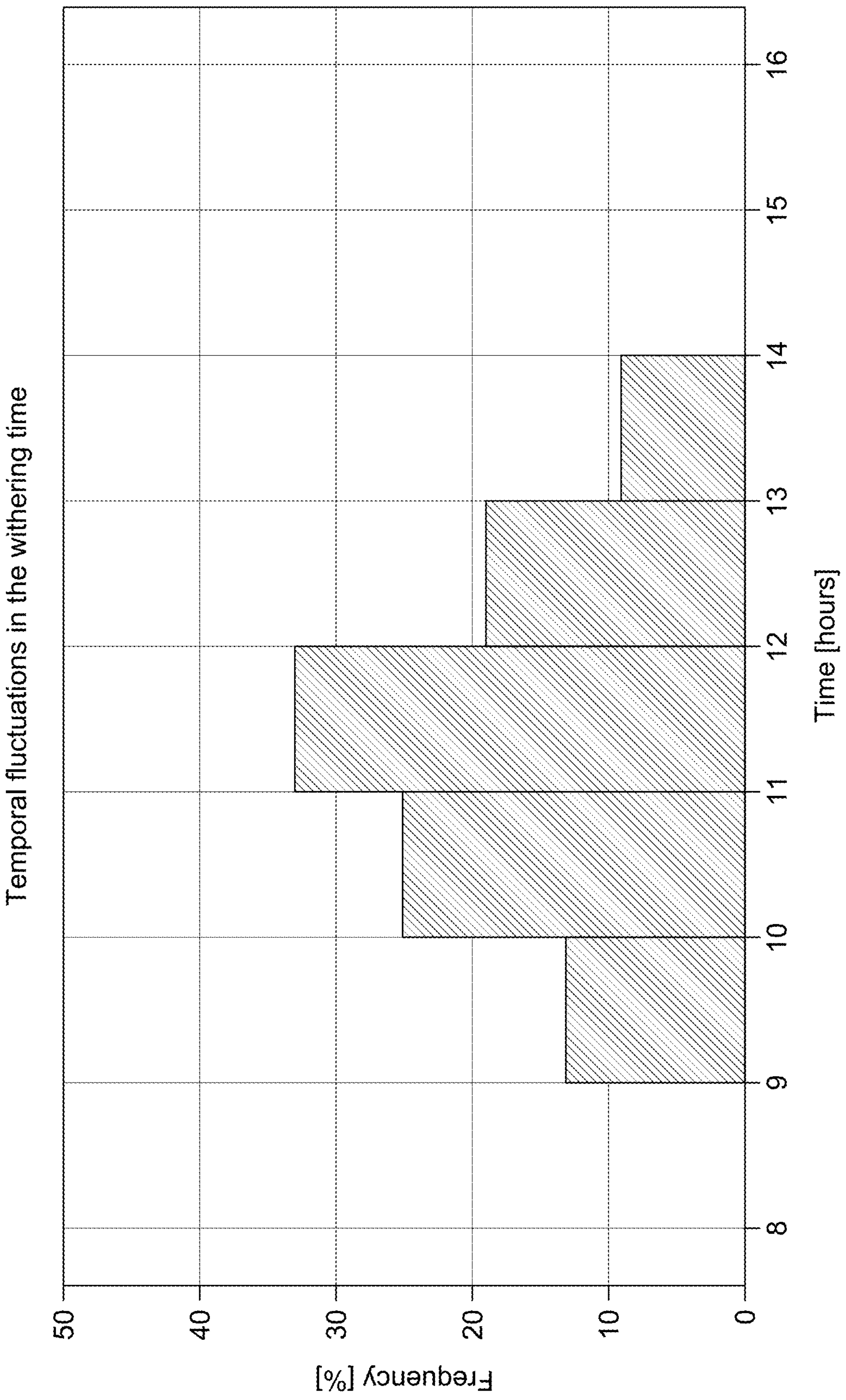
FIG. 4 shows a diagram which illustrates schematically that the withering and corresponding times are not constant, but, for example, are affected by: (i) weather conditions (for example, absolute humidity of the fresh air/supply air), (ii) initial moisture content of the malt, (iii) batch loading, and (iv) air mass flow: depending on the fan rotational speed, batch size, loading quality. Further influencing factors may comprise, for example, drying temperature, exhaust air humidity etc. It is to be pointed out that quantities that have not been able to be affected to date in the prior art, such as, for example, the trend of air humidity over time, for example, based on weather forecast measurement parameters, cannot be considered.
Figure 5:
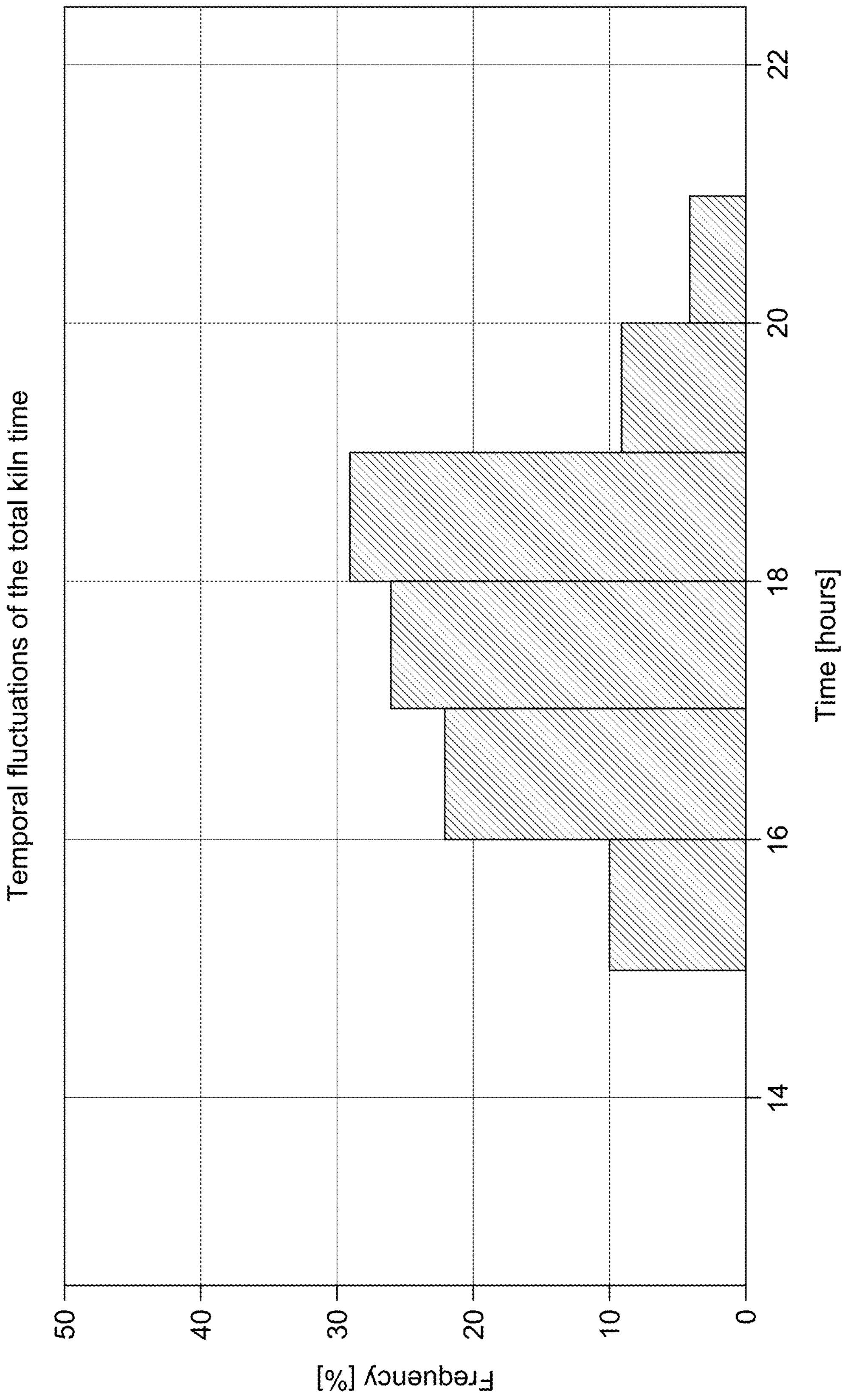
FIG. 5 shows a diagram that illustrates schematically that the resulting total kiln times are particularly dependent on (i) loading time (step 1), (ii) withering (step 3) maximum effect on variability, and (iii) final curing (step 10)
Figure 6:
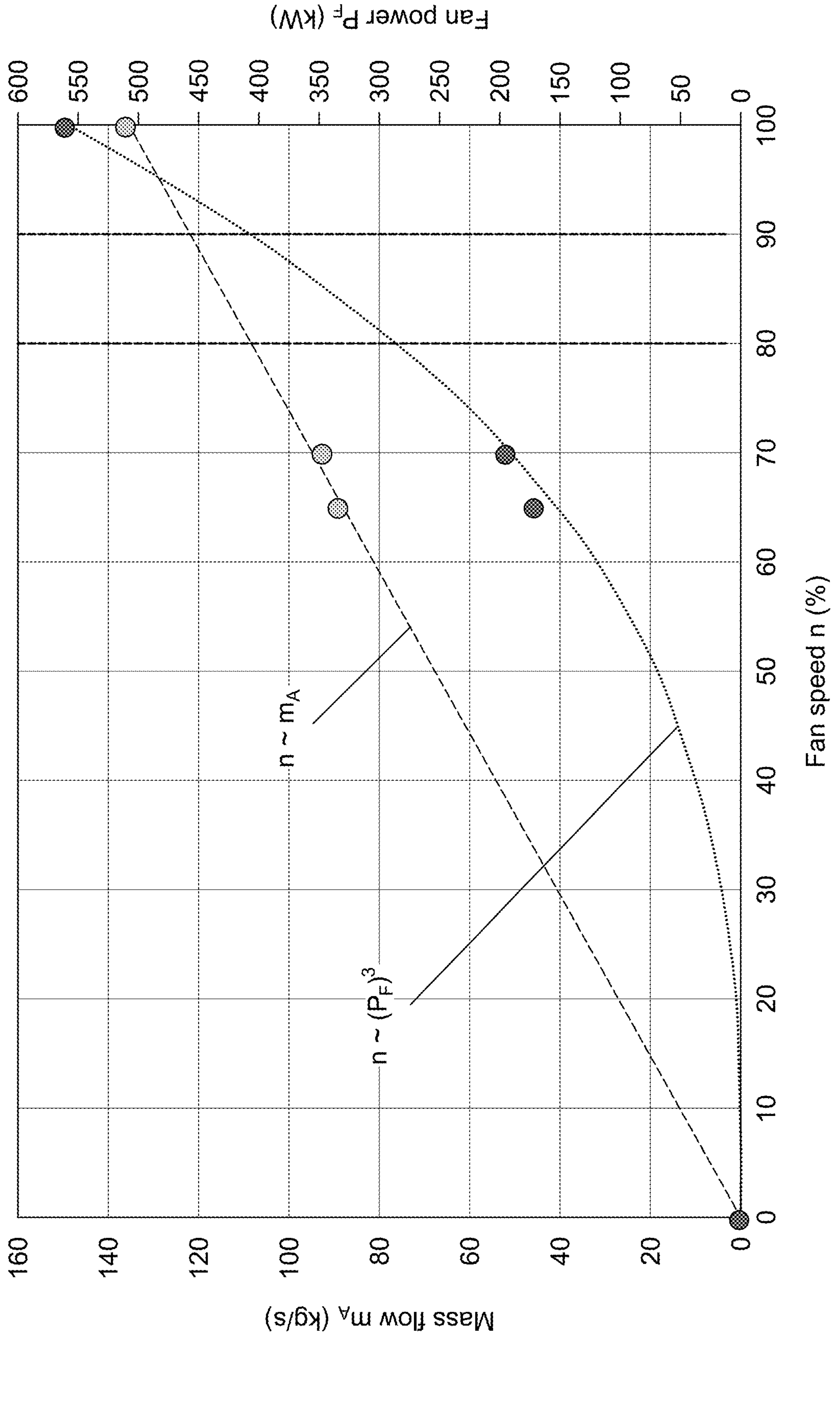
FIG. 6 shows a diagram that illustrates schematically the correlation of the fan rotational speed (n): (i) linearly with air mass flow: n~$\dot{m}$A, and (ii) to the power of three with the power consumption: n~$(P_F)^3$. A reduction of fan rotational speed by 10% extends the drying by 10%, a reduction of the fan rotational speed by 10% reduces the fan power by 27%, whereas, for example, a reduction of the fan rotational speed by 20% extends drying by 20% and reducing the fan rotational speed by 20% reduces the fan power by 49%.

For drying the green malt 2, for example, the fan 3 may be connected to the intelligent system unit 15 bidirectionally via a data transmission network 16 to generate the air mass flow 4 through the bed of drying material 2.1 of the green malt 2, wherein the intelligent system unit 15 [may] be connected to a grain moisture content sensor 17 and/or grain mass sensor 18 and/or an ambient air humidity sensor 19 and/or a plurality of sensors for weather measurement data and a forecast unit for generating the weather forecast data 20.1, 20.2 and/or a sensor for the moisture content of the drying material 21 of the green malt 2, wherein the intelligent system unit 15 furthermore comprises an optimization means 15.1 for dynamic optimization and/or adaptation and/or learning of working steps 8-14 for energy-efficient drying of green malt 2. For the dynamic rotational speed modulation of the fan 3, for example, the optimization means 15.1 of the intelligent system unit 15 may be connected by the data transmission network 16 to a rotational speed actuator 3.1 of the fan 3 for the purpose of dynamic rotational speed modulation of the fan 3. As an embodiment variant, valve adjustments, for example, of the supply air, exhaust air or with the pressure fans can be considered by the intelligent system unit 15, or even used as input or output parameters. As described, the ventilation of the kiln is done via a correspondingly dimensioned fan. It draws in the air either from a fresh air shaft or from a return air channel and pushes this into the pressure chamber located above. From there, the air penetrates the material lying on the floor and is carried away into the exhaust air channel. This forms a common shaft with the return air channel. The directional guidance of the air may, for example, be done by a closing return air valve or a gate valve. The air advance by a fan ensures, at the same level as the material, particularly as uniform as possible ventilation. Furthermore, the regulation of the quantity of air may also be realized by exhaust air gate valves and/or by valves in the channels before the fan. Nevertheless, the most direct regulation option is done via (or additionally via) the fan rotational speed, for example, using frequency-regulated motors, wherein these are controlled automatically by the intelligent system unit 15, for example, depending on the temperature difference between the upper malt layer and the inflowing air. FIG. 2 shows an example scheme of such a process. Withering 2 h at 50° C. and 2 h at about 57° C. and curing for about 5.5 h at 62° C.; about 2 h at 68° C.; about 1.5 h at 72° C., about 2 h at 80° C. and about 4 h at 85° C., in other words, up to an exhaust air temperature of approximately 80° C. Heating up in 4 h from 65 to 80° C., curing for 5 h at 80-85° C. That produces a total duration of withering and kilning of 19 h. At an exhaust air temperature of 40° C., for example, an additional rotational speed regulation may be used. The difference from the temperature in the interior may still be, for example, about 30° C. at this time. At an exhaust air temperature of 30° C., therefore, already before the start of curing, for example, a circulating air valve may be opened. The return air proportion is then, for example, 50-70% at the end of the kiln time. As mentioned for kilning, the green malt is dried from a moisture content of 38 to 46% to a single-figure value of 3 to 8%. This happens in the two withering and curing sub-steps: During withering, the temperature of the exhaust air remains relatively constant (see FIG. 2), whereas the outflowing air of the drying kiln is saturated virtually 100% with moisture. In the second phase, curing, the temperature also rises considerably inside the grain and the water is further and further extracted through the capillary effect. The downstream side air of the drying kiln is no longer saturated 100% with moisture at this stage (see FIG. 2).

As an embodiment variant, for example, the absolute exhaust air humidity during withering may be ascertained. The device may, for example, comprise a forecasting module, by means of which, based on measured weather data, such as, for example, ambient temperature, air pressure, air humidity of the environment etc., this exhaust air humidity and the exhaust air humidity at the start of kilning is determined in a forward-looking process. The forecast module may be realized as a machine-learning unit which in a supervised learning phase, by means of a feedback loop, an appropriate measurement parameter is learned for transferring. Alternatively, only ever by means of classifying by an unsupervised learning structure may the associated measurement parameter pattern be detected with a certain measured exhaust air humidity. This may be used directly for forecast determining of the exhaust air humidity or as an input for the supervised learning structure.

As an embodiment variant, for example, for the working step of withering 9 the green malt 2, an energy consumption forecast (Ev) of the kiln 1 may be generated. Also, for example, for a working step of heating up 11 the green malt 2 in the kiln 1, the energy consumption forecast (Ev) may be generated. Furthermore, for example, for the working step of curing 12 the green malt 2, and energy consumption forecast (Ev) of the kiln may also be ascertained or generated. As a further embodiment variant, for example, a specific self-test can be implemented as a safety test by means of the device. The safety check may comprise the following implementation steps: (i) Checking whether the ambient conditions are positive and the implemented safety check structure may be applied; (ii) Review/scan of sensors: detecting defined conditions, such as, for example, in one of the two fans, one of the two burners, the temperature and moisture sensor via KLN during step 0-1-2 is faulty for more than 10 min; (iii) Review of the absolute fresh air humidity after a defined limit trigger value: For example, if for one variant no more than 10 g/kg is to be for stage 2 etc.; (iv) Review of the duration of step 1: For example, it must not be more than 2.5 hours; (v) Review of the duration of step 2: For example, it must not be more than 3 hours; (vi) Checking the absolute delta moisture through the furnace-AH fresh air: for example, it should be more than 10 g/kg; (vii) Green malt content: for example, checking whether the content is <45%; (viii) Interruption of the process if one of the trigger criteria are not met. Also as an embodiment variant, risk buffers may be provided: (i) Based on the calculation of an m.c. after withering of 12%→probably 15 to 18% (3-5% buffer); (ii) The fan rotational speed may be limited, for example, to 75%, to avoid a risk and come out of the ideal range→If the generated forecasts are respectively true, the limit can be reduced; (iii) Stage 4 still runs at 100% fan rotational speed→if under-drying actually occurs during withering, a compensation in stage 4 is very probable due to the high fan rotational speed+increasing temperatures: Time buffer=90 minutes (i.e. 180 min→270 max); (iv) Maximum permitted withering time is, for example, 9 h→Then, for example, a risk buffer as maximum kiln time=21.5 h including loading time+2 h for cooling can be regulated; (v) Calculations may, for example, be based on 8.5 h, to increase the fan speed→additional buffer; (vi) The process may start with malt batches (or other less sensitive batches), that are produced for foodstuff applications, in which the specifications are less critical than for brewing applications. The aim of the risk buffer is to keep the risk of under-drying automatically as low as possible in the process.

LIST OF REFERENCE NUMERALS

1 Kiln
2 Germinated Seeds, e.g. Green Malt
  21 Bed Of Drying Material
  22 Grain
3 Fan
  31 Rotational Speed Actuator Of 3
4 Air Mass Flow
5 Steeping
6 Germinating
7 Ambient Air
8 Loading
9 Withering
10 Breakthrough
11 Heating Up
12 Curing
13 Cooling
14 Unloading
15 Intelligent System Unit
  15.1 Optimization Means
16 Data Transmission Network
17 Grain Moisture Content Sensor
18 Grain Mass Sensor
19 Ambient Air Humidity Sensor
20 Sensors for Weather Measurement Data (20.1, 20.2)
21 Drying Material Moisture Content Sensor
22 Grain Store
23 Steep
24 Malting Box
25 Malt Silo
26 Weather Station
27 Kilned Malt
n Rotational Speed Of 3 In %
Ht Moisture Content Of Drying Material
Gt Limit Of Ht
Hg Grain Moisture Content
Mg Grain Mass
Hl, Hla Ambient Air Humidity, Absolute Ambient Air Humidity
W1, W2 Weather Forecast Data From Hl (May Also Comprise Hla)
Ev Energy Consumption Forecast
t Kiln Time
$t_{max}$ Specified Maximum Kiln Time

The invention claimed is:

1. A process for energy-efficient drying of germinated seed in a drying kiln using a rotational speed-modulated fan for directing an air mass flow through a bed of drying material for the germinated seed, comprising:

detecting a grain moisture content and a grain mass of a grain which is a basis for the bed of drying material of the germinated seed after steeping and germinating;

detecting an ambient air humidity for ambient air used for the air mass flow;

detecting weather forecast data, at least with respect to the ambient air humidity;

monitoring, while drying, a drying material moisture content of the germinated seed up to a specified limit; and setting a rotational speed modulation of the fan such that a specified maximum kiln time is reached and/or maintained, based on the grain moisture content, the grain mass, the ambient air humidity, the weather forecast data, and a drying material moisture content of the germinated seed.

2. The process according to claim 1, wherein: the germinated seed comprises green malt.

3. The process according to claim 1, wherein: the detecting of the ambient air humidity detects an absolute ambient air humidity of the ambient air used for the air mass flow.

4. The process according to claim 3, wherein: the detecting of the weather forecast data detects the absolute ambient air humidity.

5. The process according to claim 4, wherein: the detecting of the weather forecast data continuously detects the absolute ambient air humidity for a time duration defined from loading of the kiln and/or from a start of the rotational speed-modulated fan.

6. The process according to claim 5, wherein: the time duration corresponds to a duration of a scheduled drying time.

7. The process according to claim 1, wherein: the limit of the moisture content of the drying material of the germinated seed is a maximum of 10%.

8. The process according to claim 7, wherein: the limit of the moisture content of the drying material of the germinated seed is a maximum of 5%, or between 5% and 7%, or between 5% and 10%.

9. The process according to claim 2, wherein: the detecting of the moisture content of the grain, the grain mass, the ambient air humidity, the weather forecast data with respect to the ambient air humidity and the moisture content of the drying material of green malt are intelligently performed such that the rotational speed modulation of the fan is done in such a way that the maximum kiln time is reached and/or is maintained, and an energy consumption forecast is ascertained.

10. The process according to claim 9, wherein: drying of germinated seeds in the kiln comprises at least withering and curing as two drying phases, wherein for the withering of the green malt in the kiln, the energy consumption forecast is ascertained.

11. The process according to claim 10, wherein: the drying of germinated seeds in the kiln comprises heating up between the withering and the curing, wherein for the heating up of the germinated seed in the kiln, the energy consumption forecast is ascertained.

12. The process according to claim 10, wherein: the energy consumption forecast is ascertained for curing of the germinated seed in the kiln.

13. A device for energy-efficient drying of germinated seed, comprising:

a drying kiln;

a rotational speed-modulated fan for directing an air mass flow through a bed of drying material for the germinated seed;

a detector for detecting a grain moisture content and a grain mass of a grain which is a basis for the bed of drying material of the germinated seed after steeping and germinating;

a detector for detecting an ambient air humidity for ambient air used for the air mass flow;

a detector for detecting weather forecast data, at least with respect to the ambient air humidity;

circuitry configured to monitor, while drying, a drying material moisture content of the germinated seed up to a specified limit; and circuitry configured to set, via a data transmission network, a rotational speed modulation of the fan such that a specified maximum kiln time is reached and/or maintained, based on the moisture content of the grain, the grain mass, the ambient air humidity, the weather forecast data, and a moisture content of the drying material of the germinated seed.

14. The device according to claim 13, wherein: the circuitry configured to set is connected by the data transmission network to a rotational speed actuator of the fan for dynamic rotational speed modulation of the fan.

15. The device according to claim 13, wherein: the detector for detecting the grain moisture content monitors up to the specified limit via an inline moisture detector.

16. The device according to claim 13, wherein: the detector for detecting the ambient air humidity performs the detecting during withering.

17. The device according to claim 13, further comprising: a memory for storing forecast information corresponding to absolute exhaust air humidity during withering, wherein the circuitry configured to set uses the forecast information corresponding to absolute exhaust air humidity during the withering.

18. The device according to claim 17, further comprising: a forecast module which is trained using machine learning to generate the forecast information.

19. The device according to claim 13, further comprising: a memory for storing forecast information corresponding to exhaust air humidity during withering, wherein the circuitry configured to set uses the forecast information corresponding to exhaust air humidity during the withering.

* * * * *